US008682539B2

(12) United States Patent  (10) Patent No.: US 8,682,539 B2
Jones et al.  (45) Date of Patent: *Mar. 25, 2014

(54) MACHINE EMPLOYING CAB MOUNTS AND METHOD FOR CONTROLLING CAB MOUNTS BASED ON MACHINE OPERATION

(75) Inventors: Steven D. Jones, Metamora, IL (US);
Ronald B. Warnat, Howell, MI (US);
Brett D. Ellen, Peoria Heights, IL (US);
Nathan S. Pauli, Peoria, IL (US);
Michael S. Contratto, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 533 days.

This patent is subject to a terminal disclaimer.

(21) Appl. No.: 12/637,555

(22) Filed: Dec. 14, 2009

(65) Prior Publication Data

US 2010/0152979 A1  Jun. 17, 2010

Related U.S. Application Data

(60) Provisional application No. 61/122,490, filed on Dec. 15, 2008.

(51) Int. Cl.
*G06G 7/00* (2006.01)
*G05D 1/08* (2006.01)
*B60G 17/018* (2006.01)
*F16F 9/53* (2006.01)
*B60G 17/0165* (2006.01)
*E02F 9/20* (2006.01)
*B60N 2/02* (2006.01)

(52) U.S. Cl.
CPC ............. *E02F 9/2025* (2013.01); *B60N 2/0248* (2013.01); *B60G 2400/252* (2013.01); *F16F 9/532* (2013.01); *B60G 17/0165* (2013.01); *B60G 2400/102* (2013.01)
USPC ............. 701/50; 701/49; 701/37; 188/267.1; 280/5.508; 280/5.512; 280/5.515

(58) Field of Classification Search
USPC ........ 701/37, 49, 50, 35; 702/182; 188/267.1; 180/89.13, 89.14; 296/190.07, 190.5
See application file for complete search history.

(56) References Cited

U.S. PATENT DOCUMENTS 4,283,087 A * 8/1981 Kauss et al. ............. 296/190.07
(Continued)

FOREIGN PATENT DOCUMENTS

CN  1965175  5/2007
(Continued)

OTHER PUBLICATIONS

Office Action from related U.S. Appl. No. 12/637,567; action dated Sep. 24, 2012.
(Continued)

*Primary Examiner* — Helal A Algahaim
*Assistant Examiner* — Dale W Hilgendorf
(74) *Attorney, Agent, or Firm* — Miller, Matthias & Hull

(57) ABSTRACT

A machine employing controllable mounts and a method for controlling such mounts based on machine operation are disclosed. The controllable mount may include a housing, a pin, rheological fluid within the housing and coils provided proximate to the rheological fluid. As current is applied to the coils, the apparent viscosity of the rheological fluid is increased, and in so doing so are the damping and stiffness properties of the controllable mount. With other operations such as roading or working on a flat surface, the feedback afforded by the mounts is not as important as operator comfort, in which case the current applied to the coils can be lowered and thus the mount can be made more relaxed. The machine of the present disclosure identifies the machine operation being performed through sensors, predictive algorithms, implement position, and operator input and sets the current and properties of the controllable mounts accordingly.

20 Claims, 8 Drawing Sheets

(56) References Cited

U.S. PATENT DOCUMENTS

| | | | |
|---|---|---|---|
| 5,014,829 A * | 5/1991 | Hare, Sr. | 188/267.1 |
| 5,044,455 A * | 9/1991 | Tecco et al. | 180/89.13 |
| 5,161,653 A * | 11/1992 | Hare, Sr. | 188/267.1 |
| 5,623,410 A * | 4/1997 | Furihata et al. | 701/37 |
| 6,029,764 A | 2/2000 | Schubert | |
| 6,061,617 A * | 5/2000 | Berger et al. | 701/50 |
| 6,382,369 B1 * | 5/2002 | Lisenker | 188/267.2 |
| 7,063,191 B2 | 6/2006 | Hopkins et al. | |
| 7,232,180 B2 * | 6/2007 | Biasiotto et al. | 296/190.07 |
| 7,487,066 B2 * | 2/2009 | Sundermeyer et al. | 702/182 |
| 7,921,973 B2 | 4/2011 | Wereley et al. | |
| 8,111,147 B2 | 2/2012 | Litkouhi | |
| 2003/0015830 A1 | 1/2003 | Miller et al. | |
| 2004/0232632 A1 | 11/2004 | Beck et al. | |
| 2006/0224286 A1 * | 10/2006 | Izawa et al. | 701/37 |
| 2007/0257408 A1 * | 11/2007 | St.Clair et al. | 267/64.28 |
| 2008/0272528 A1 * | 11/2008 | Yoshino | 267/140.15 |

FOREIGN PATENT DOCUMENTS

| | | |
|---|---|---|
| EP | 1961870 A1 | 8/2008 |
| JP | 07-094985 B2 | 10/1995 |
| JP | 02-905065 B2 | 3/1999 |
| JP | 2006-275287 A | 10/2006 |

OTHER PUBLICATIONS

Office Action from related U.S. Appl. No. 12/637,539; action dated Oct. 24, 2012.

Office Action from related U.S. Appl. No. 12/637,588; action dated Dec. 13, 2012.

* cited by examiner

MACHINE EMPLOYING CAB MOUNTS AND METHOD FOR CONTROLLING CAB MOUNTS BASED ON MACHINE OPERATION

CROSS-REFERENCE TO RELATED APPLICATION

This is a non-provisional application claiming priority under 35 USC 119(e) to U.S. Provisional Patent Application Ser. No. 61/122,490 filed on Dec. 15, 2008.

TECHNICAL FIELD

The present disclosure generally relates to cab mounts and, more particularly, relates to machines employing cab mounts and methods for controlling cab mounts.

BACKGROUND

In many different heavy equipment machines, an operator cab is supported by a frame of the machine with cab mounts. Cab mounts are available in many different forms and configurations and generally try to isolate the cab from the undercarriage of the machine so as to limit the vibrational impact experienced by the operator when the machine moves or performs work. For example, with a loader traveling over rocky terrain, the chassis, undercarriage, and wheels/track of the loader may be jostled and bounced around considerably, but as the cab is not fixedly mounted to the frame, the play afforded by the cab mounts lessens the effect of that motion on the operator.

Such mounts can be as simple as a mechanical spring or an elastomeric shock absorber offering a fixed level of vibration damping. Other types of mounts are fluid or electro-chemical in nature. Magneto-Rheological (MR) and Electro-Rheological (ER) mounts are two examples of such mounts. Taking a MR mount as an example, generally it includes a housing containing MR fluid, a structure that moves through the MR fluid, and a coil for providing a magnetic field across the MR fluid. By directing current to the coils, not only is the magnetic field created through the MR fluid, but the apparent viscosity of the MR fluid is increased as well. As the structure moves through the MR fluid, increasing the apparent viscosity of the MR fluid makes the mount more rigid.

One example of a MR mount is disclosed in U.S. Pat. No. 7,063,191. The '191 patent discloses a hydraulic mount that includes a decoupler sub-assembly, a body filled with MR fluid, a pumping chamber and a diaphragm chamber. The body may be formed from a flexible, molded elastomer, such that vibrational inputs from the engine elastically deform the pumping chamber to cause fluid transfer between the pumping chamber and the diaphragm chamber through the decoupler sub-assembly for viscous damping. While somewhat effective, such a mount provides no feedback Another example of a MR mount is disclosed in US Patent Application Publication No. 2007/0257408, published Nov. 8, 2007 to Kenneth Alan St. Clair. et al. The '408 publication discloses a strut with a magneto-rheological fluid damper that includes a tubular housing filled with magneto-rheological fluid and a piston head movable within the tubular housing along its longitudinal length.

SUMMARY OF THE DISCLOSURE

In accordance with one aspect of the disclosure, a machine is therefore disclosed which comprises a frame, an operator cab supported by the frame, at least one movable implement operatively associated with the frame, a controllable mount operatively connecting the operator cab to the frame and including a housing, a pin mounted within the housing, a rheological fluid within the housing, and coils positioned relative to the housing to generate a field through the rheological fluid, and a controller operatively associated with the coils and adapted to change a level of current applied to the coils to adjust an apparent viscosity of the rheological fluid based on machine operation.

In accordance with another aspect of the disclosure a method of controlling a cab mount is disclosed wherein the method comprises connecting a cab to a machine using a cab mount, the machine including at least one movable implement, the cab mount having a housing and a pin movable relative to the housing, sensing a type of operation being performed by the machine, and adjusting current flow to the coils based on the sensed operation.

In accordance with yet another aspect of the disclosure a control system for controlling a mount operatively connecting an operator cab to a frame of a machine having at least one movable implement is disclosed, wherein the control system comprises a processor operatively connected to the mount, the mount including a housing, a pin movable within the housing, a volume of rheological fluid within the housing, and coils mounted proximate to the rheological fluid, a sensor adapted to monitor the position of an implement attached to the machine, and a controller adapted to determine the type of operation being performed by the machine based on the sensed position of the implement attached to the machine and adjust the apparent viscosity of the rheological fluid based on the determined type of operation.

DETAILED DESCRIPTION

Figure 1:
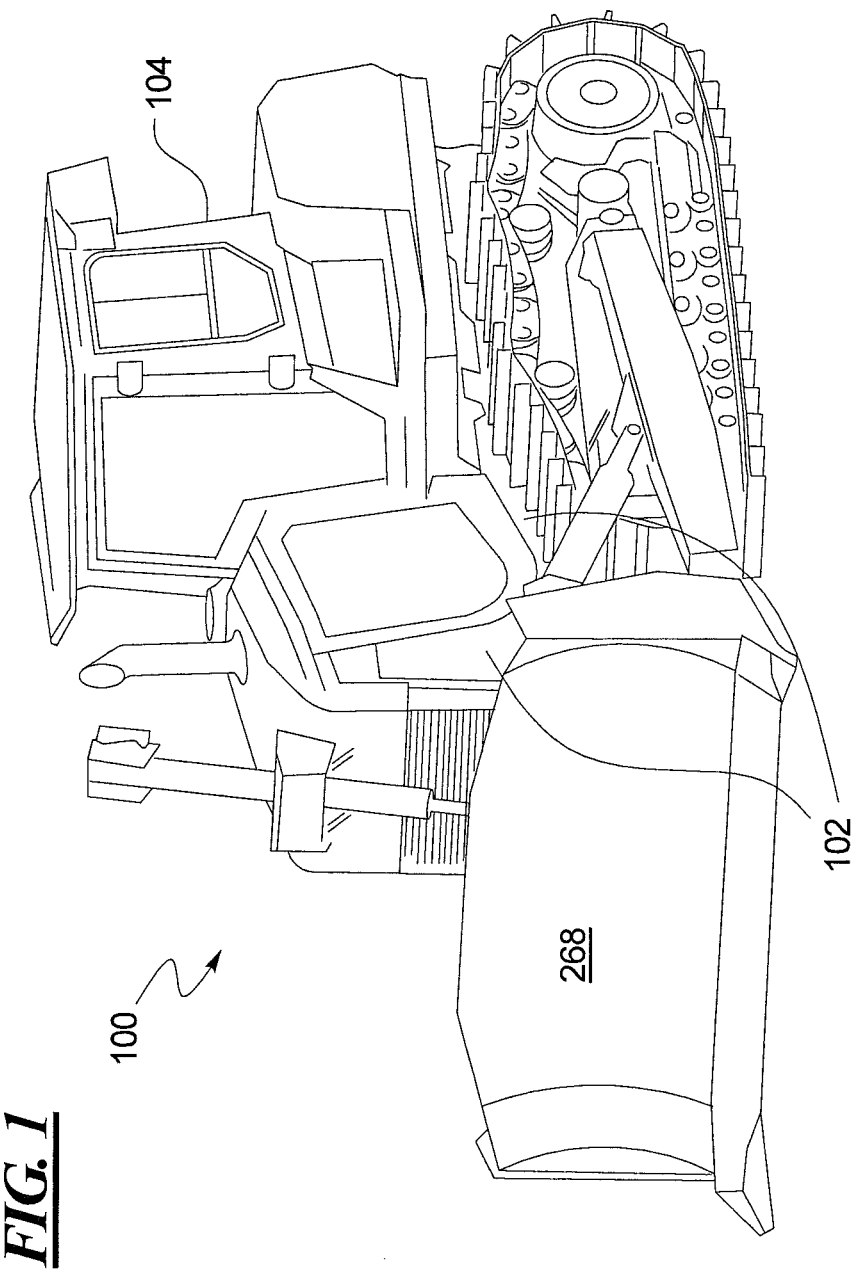
FIG. 1 is a perspective view of a machine constructed in accordance with the teachings of this disclosure.

Referring now to the drawings, and with specific reference to FIG. 1, a machine constructed in accordance with the teachings of this disclosure is generally referred to by reference numeral 100. The machine 100 includes a frame 102 supporting an operator cab 104. As shown, the machine 100 is depicted as a track-type tractor, but is to be understood that the teachings of this disclosure can be employed with equal efficacy with other heavy industry and construction machines such as, but not limited to, backhoe loaders, wheel loaders, tracked loaders, articulated trucks, off-highway trucks, excavators, motor graders, fork-lifts, skid steers, or any other machine known in the art that includes a cab mounted to a frame.

Figure 2:
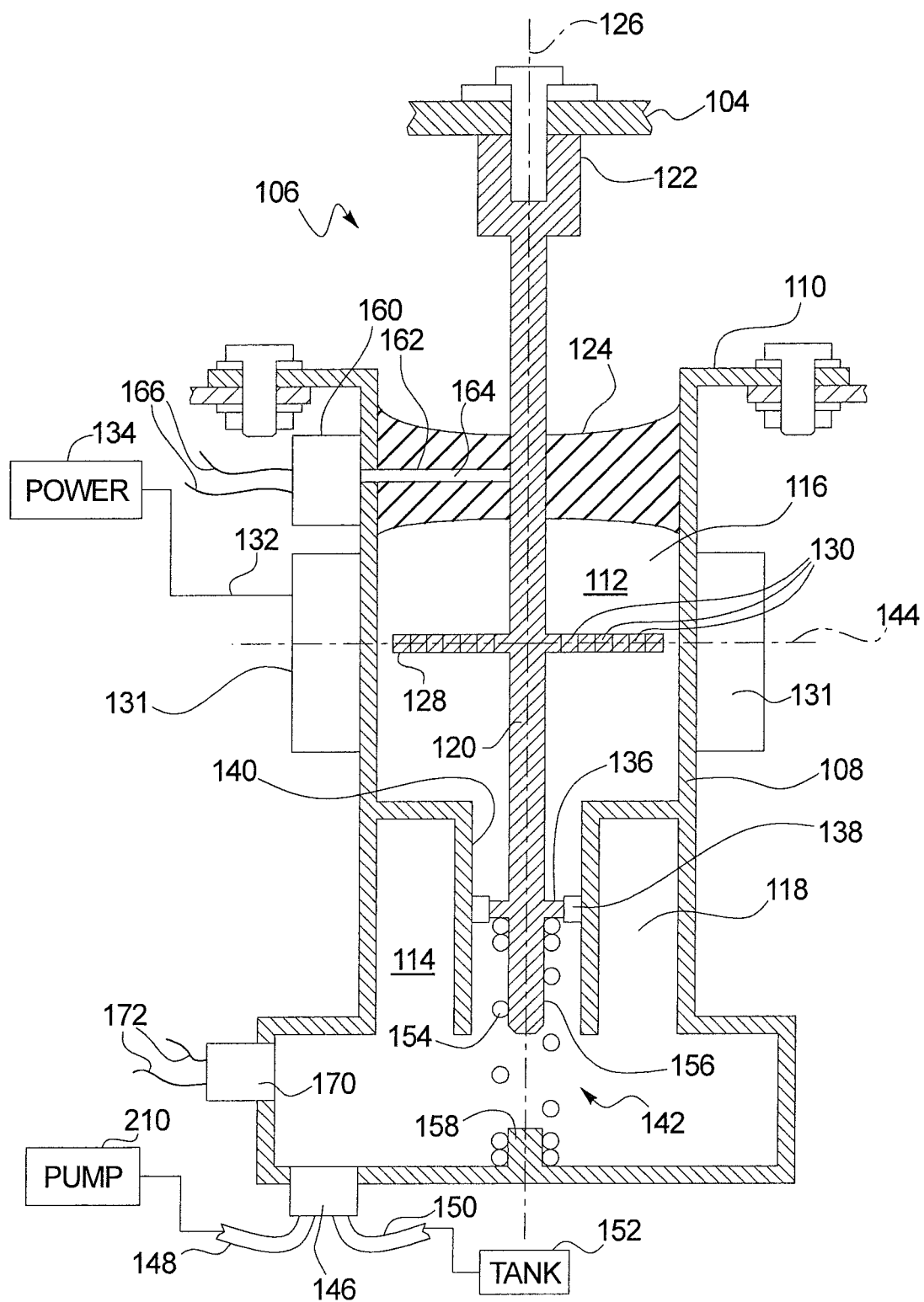
FIG. 2 is a sectional view of a controllable mount constructed in accordance with the teachings of this disclosure.

Referring now to FIG. 2, a cross-sectional view illustrates an example of one embodiment of a controllable mount 106 for use with the machine 100 and method disclosed herein. As shown, the controllable mount 106 may include a housing 108 that may be mounted to the frame 102 (see FIG. 1) via a mounting flange 110. The housing 108 may include a first chamber 112 and a second chamber 114. As will be described in further detail herein, the first chamber 112 may be filled with a rheological fluid 116 such as a magneto-rheological (MR) fluid or an electro-rheological (ER) fluid. The second chamber 114 may be filled with a compressed fluid 118 such as compressed gas including compressed air.

The controllable mount 106 may also include a pin 120 that is partially disposed with the housing 108 and may be attached to the cab 104 at a mounting end 122. The pin 120 may be attached to the housing 108 by an elastomeric member 124 that permits the pin 120 limited axial movement along axis 126 and radial movement perpendicular to the axis 126. The elastomeric member 124 may dampen axial as well as radial motion between the pin 120 and the housing 108.

As shown, a damping plate 128 may be attached to the pin 120 and be disposed within the rheological fluid 116 of the first chamber 112. The damping plate 128 may include a plurality of apertures 130 to permit the rheological fluid 116 to pass through the damping plate 128. As the damping plate 128 is moved through the rheological fluid 116, the relative motion between the housing 108 and the pin 120 is damped. The level of damping may be adjusted by applying a magnetic or electric field to the rheological fluid 116. Moreover, by changing the strength of the magnetic or electric field, the apparent viscosity of the rheological fluid 116 is proportionally changed thereby providing a mechanism by which the degree of damping afforded by the controllable mount 106 can be tailored to the needs of the operator.

In order to generate the magnetic or electric field, coils 131 are provided proximate the rheological fluid 116. More specifically, the coils 131 may be mounted on the housing 108 laterally adjacent the first chamber 112. Leads 132 may extend from the coils 131 for connection to a controllable power supply 134. Alternatively, or additionally, the coils 131 may be mounted on the pin 120 and/or the damping plate 128.

The pin 120 may also include a plunger 136 that separates the first chamber 112 from the second chamber 114. The plunger 136 may include a seal 138 that seals against a shaft 140 of the housing 108. In such a configuration, the plunger 136 and the second chamber 114 act as a gas spring 142 for positioning the pin 120 at an ideal snubbing height 144, the importance of which will be described in further detail herein. The pressure of the compressed fluid 118 within the gas spring 142 may be adjusted by way of a valve 146. By adjusting the pressure of the compressed fluid 118, the biasing force of the gas spring 142 applied to the plunger 136 is adjusted as well. A first hose or tube 148 may be connected to the valve 146 to supply pressurized fluid 118 to the second chamber 114. The valve 146 may also include a second hose or tube 150 to return the pressurized fluid 118 within the second chamber 114 to a storage tank 152, or to be vented to atmosphere.

To assist in biasing the plunger 136 toward the ideal snubbing height 144, a mechanical spring 154 may also be used. The spring 154 may be disposed about a guide extension 156 of the pin 120 and extend between the guide extension 156 and a base 158 of the housing 108. The guide extension 156 may be positioned to contact the housing 108 and act as a first end stop for the controllable mount 106.

The controllable mount 106 may also include a sensor 160 for generating a signal indicative of the relative displacement between the cab 104 and the frame 102. In the current embodiment, it does so by determining the relative displacement between the housing 108 and the pin 120. The sensor 160 may include a strain gauge (not shown) disposed in a channel 162 provided in the elastomeric member 124. Alternatively, the channel 162 may be filled with a conductive elastomer 164 having an electrical conductivity and resistance that changes with elongation and contraction. More specifically, the strain placed on the conductive elastomer 164 may be correlated to the resistance exhibited by the conductive elastomer 164. Thus, as the resistance is measured, the relative displacement between the housing 108 and the pin 120 may be calculated. Leads 166 may be used to communicate data from the sensor 160 to an electronic control unit 168 (see FIG. 4).

The controllable mount 106 may also include a sensor 170 to monitor the pressure of fluid 118 within the second chamber 114. The pressure sensor 170 may be connected to the electronic control unit 168 as well with leads 172. In general, the pressure sensor 170 may be used to measure pressure spikes and thus wear on the elastomeric member 124. In so doing, the remaining life and serviceability of the controllable mount 106 can be calculated. In addition, failure of either sensor 160 or 170 may indicate that the controllable mount 106 needs replacement or repair.

As an alternative or addition to the sensor 160 within the elastomeric member 124, the pressure sensor 170 may also be used to determine the displacement of the pin 120 relative to the housing 108. More specifically, the displacement may be determined using the formula:

$$V_n = P_i * V_i / P_n$$

wherein:
  $V_n$ is the new volume;
  $P_i$ is the initial pressure;
  $V_i$ is the initial volume; and
  $P_n$ is the new pressure.

Initial pressure and initial volume could be initially calibrated from a known position of the pin 120 and could correspond to the volume and pressure of the second chamber 114. New pressure and new volume could correspond to the displacement from the initial position. The new position may be determined from the new volume using the formula:

$$D = (V_n - V_i)/(\pi * R^2)$$

wherein:
  D is the change in displacement;
  R is the radius of the shaft 140;
  $V_i$ is again the initial volume; and
  $V_n$ is again the new volume.

Temperature compensation may also be used to increase the accuracy of the displacement measurement. Alternatively, the displacement may be determined through stored tables where these calculations have already been determined.

This calculated displacement may then be used to provide feedback in a control algorithm executed by the electronic control unit 168 controlling the mount 106. More specifically, the calculated displacement data may be used to adjust the current applied to the coils 130 of the controllable mount 106 and hence adjust the apparent viscosity of the controllable mount 106 to provide improved performance.

In one embodiment, the apparent viscosity of the rheological fluid 116 is changed in direct relation to the displacement of the mount 106. Thus, as the pin 120 moves away from the ideal snubbing height 144, more current is applied to the coil and the apparent viscosity of the rheological fluid 116 increases to bias the pin 120 away from engagement with the housing 108. In so doing, the pin 120 and damping plate 128 encounter greater resistance to movement and thus this feedback control may be used to minimize occurrences where the pin 120 reaches an endstop, also known as bottoming or topping out.

In another embodiment, statistical analysis of the data from one or more sensors 160, 170 may be used to interpret the displacement of the controllable mount 106 over time and adapt the control of the controllable mount 106 to changes in weight in the cab, i.e., the weight of different operators, their tools and accessories, and the like. Initial pressure and initial volume may be determined and calibrated at the factory and during machine servicing.

This displacement data may also be statistically analyzed and kept for long term storage. The historical data may include average displacements, frequency domain, and power spectral density data. The historical statistical displacement data may be used to determine when to replace a specific mount. For example, if the controllable mount is operating outside of its historical average, the controllable mount would be deemed to need replacement. Additionally, the history may be taken over the life of the controllable mount to develop a long historical average. The long historical average may be compared to a medium history and a short history to provide a total error or a point by point error to look for problems in performance.

By tracking and maintaining a historical statistical average of displacement, the set and creep of the elastomeric member 124 may also be determined. As used herein, the "set" and "creep" of the elastomeric member 124 refers to changes in the elasticity of the elastomer. Initially, the elastomer will deform predictability and return to the same shape and strength. Over time and repetitive motion, however, the elastomer may begin to change at the molecular level so as not to exhibit the same elasticity. In the present application this can cause the elastomeric member 124 to begin to sag over time.

Figure 3:
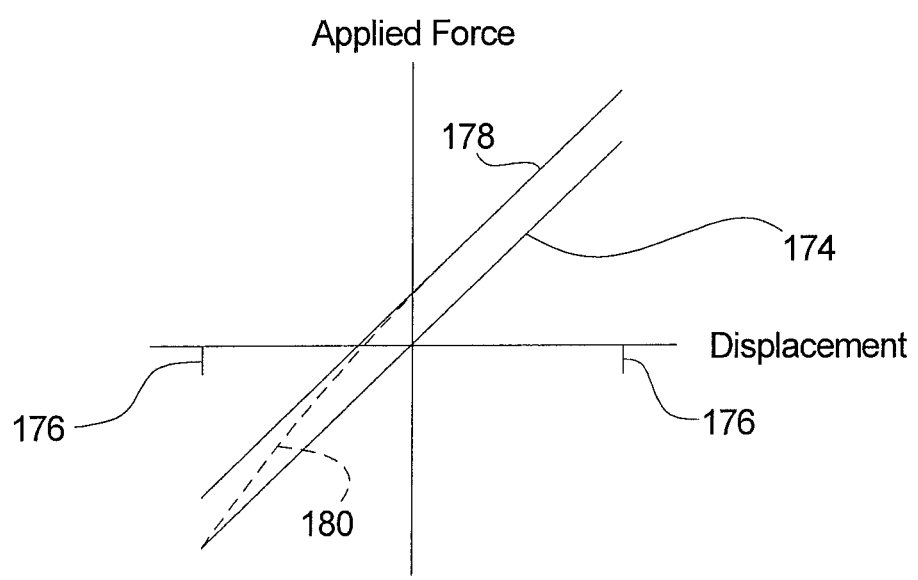
FIG. 3 a chart depicting creep in an elastomeric member of the controllable mount during initial use, over time, and as corrected.

In graphical form, this means that as the elastomeric member 124 sags, sets, and begins to creep, the elastomeric member 124 may begin to behave nonlinearly as shown in FIG. 3. As shown, the elastomeric member 124 may initially behave in a generally linear fashion as indicated by line 174 between the end stops 176. However, over time, the elastomeric member 124 may take on a set and begin to creep as shown by line 178.

The electronic control unit 168 may be used to compensate for this change in the material properties, as well as, minimize the effects of creep. For example, the electronic control unit 168 may be used to adjust the current applied to the coils 130 and thereby correct for the change in the material properties of the elastomeric member 124, which is shown as dotted line 180. Thus more current may be applied to the coils 130 when negative displacement is determined and less where positive displacement is determined. In configurations where a pneumatic system is available to increase the gas pressure within the gas spring 142, the increased gas pressure may be used to compensate further and bias the pin 120 toward the ideal snubbing height 144.

Figure 4:
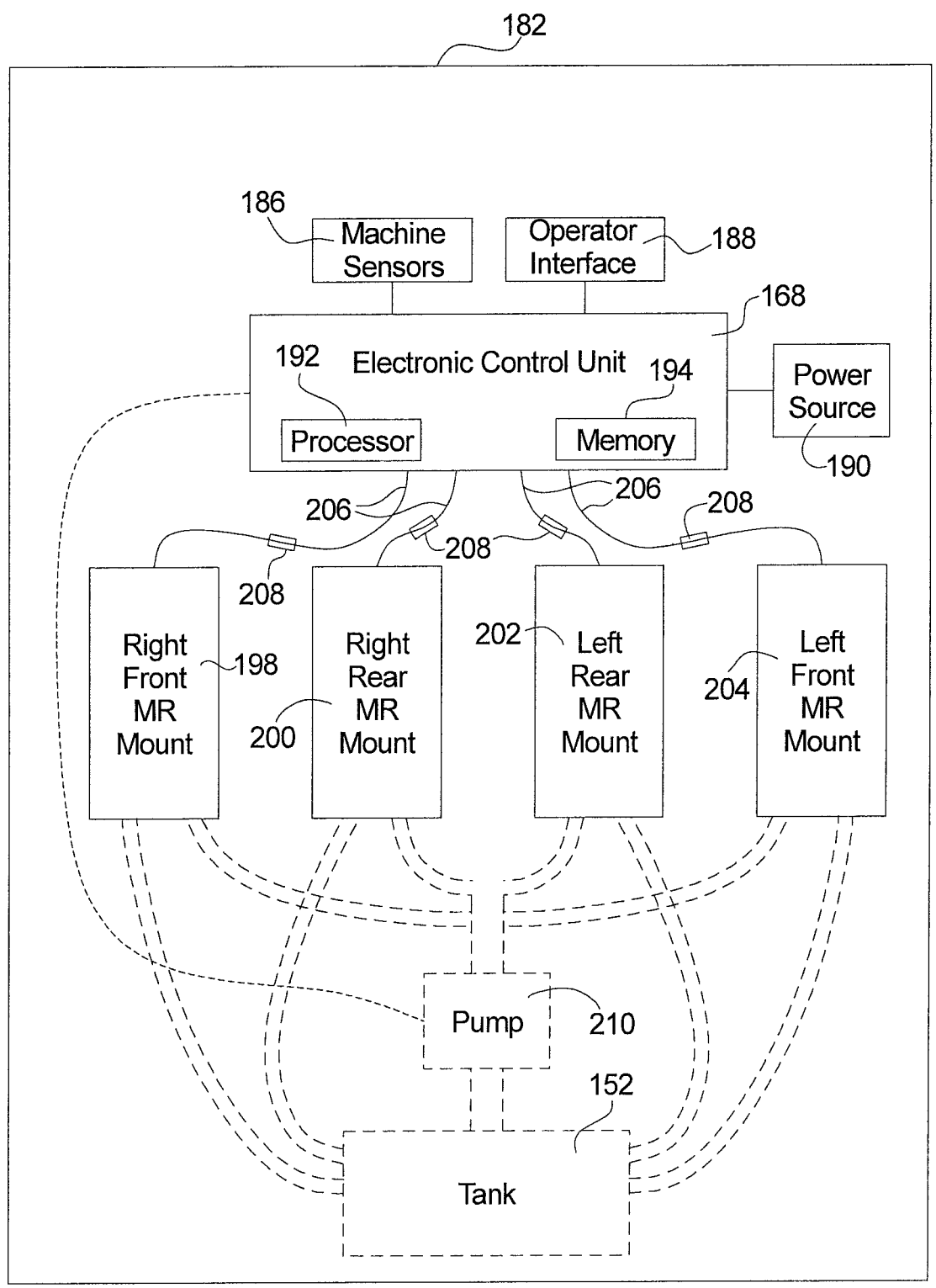
FIG. 4 is a schematic representation of a control system constructed in accordance with the teachings of this disclosure.

Referring now to FIG. 4, a schematic diagram illustrates a control system 182 for a machine 100 on which the controllable mounts 106 may be used. As shown, the system 182 includes the electronic control unit 168 that is in electrical communication with machine sensors 186, an operator interface 188, and a power source 190. The electronic control unit 168 may include a processor 192 and a computer readable media or memory 194 for storing instructions. Machine sensors 186 may include a wide variety of sensors including accelerometers, inclinometers, temperature sensors, pressure transducers, and other sensors known in the art for use on the machine 100. The operator interfaces 188 may include joysticks, pedals, switches, buttons, touch screens, keypads, and other devices known in the art for receiving operator input.

The electronic control unit 168 may also be in electrical communication with a plurality of controllable mounts 106 used to mount the cab 104 to a machine frame 102. Such mounts 106 may include a right front controllable mount 198, a right rear controllable mount 200, a left rear controllable mount 202, and a left front controllable mount 204. The right front controllable mount 198, right rear controllable mount 200, left rear controllable mount 202, and left front controllable mount 204 may each include the features of controllable mount 106 described above, as well as other features of controllable mounts known in the art.

In one embodiment, the controllable mounts 106 may be identical. However, their physical positions on the machine frame 102 and cab 104 may be different and known via a wiring harness 206 provided between the controllable mounts 106 and the electronic control unit 168. For example, a series of switches 208 may be coded to indicate the position of each controllable mount 106 on the machine frame 102. If four mounts 106 are used, for example, the following codes of TABLE 1 may be used:

TABLE 1

| Position | Switch 1 | Switch 2 |
| --- | --- | --- |
| Cab, forward, right | 0 | 0 |
| Cab, forward, left | 0 | 1 |
| Cab, rear, right | 1 | 0 |
| Cab, rear, left | 1 | 1 |

The harness codes may provide the switch functionality through two wires and a ground line (not shown) being run to each mount location as part of the wiring harness 206. The switches 208 of the above table are then provided for in each connector by connecting a respective wire to ground to provide a 1 and left open for a 0. This may be routed through the connector to the controllable mount 106 so that the controllable mount 106 can identify its position on the machine frame 102. This positional information may be used to tune and more precisely control the controllable mounts 106 on the machine frame 102.

In another embodiment, the controllable mounts 106 may be distinct and be configured to receive a specific connector from the wiring harness 206. Alternatively, a generic wiring harness 206 may be used and each controllable mount 106 may be given its address by a technician to communicate its position to the electronic control unit 168.

Optionally and as shown, the controllable mounts 106 may each include the gas spring 142 as discussed above in relation to FIG. 2. Each gas spring 142 may be pneumatically connected to a source of pressurized gas, such as a pump 210, and a source of low pressure gas, such as the tank 152. In the depicted embodiment, the electronic control unit 168 is shown as being in communication with the pump 210, but the control need not be electronic. For example a mechanical valve arrangement can be used. With the electronic embodiment, however, if the pressure of gas within the gas spring 142 of the right front controllable mount 198 is determined to be too low, for example, the electronic control unit 168 may command the pump 210 to provide pressurized gas and command a pneumatic valve (not shown) of the right front controllable mount 198 to open and receive the pressurized gas to increase the gas pressure within the gas spring 142. When the pressure of the gas spring 142 is sufficient, the electronic control unit 168 may close the valve and shut down the pump 210. Alternatively, in situations where the pressure is too high in the gas spring 142, the electronic control unit 168 may open the valve to the tank 152 and close the valve when the pressure has been sufficiently reduced.

Accurate mount displacement measurement permits the controllable mounts 106 to be maintained at or near the ideal snubbing height 144 for maximum effectiveness of the controllable mounts 106. By maintaining each mount at their ideal snubbing height 144 throughout their useful life, excessive loading and bottoming out/topping out of the mount 106 during machine operation may be minimized or prevented. Consequently, fewer replacement parts of the cab 104 and mounts 106 may be needed over the life of the machine 100. The present disclosure and its accommodating of different static loads of the cab 104 may permit different systems and options to be installed at different times without having to replace the mounts 106, thus providing a high degree of modularity and tailoring of the machine 100 to specific applications over the entire machine life while retaining the same mount package.

Figure 5A:
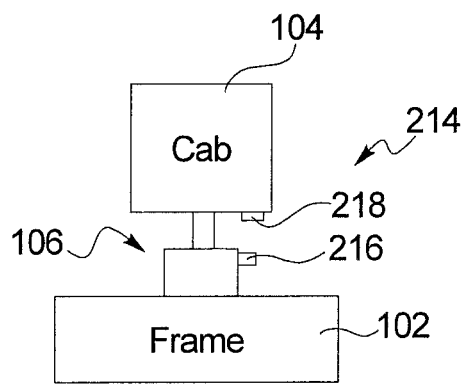
FIGS. 5*a-d* are schematic representations of alternative embodiments for sensing mount displacement.
Figure 5B:
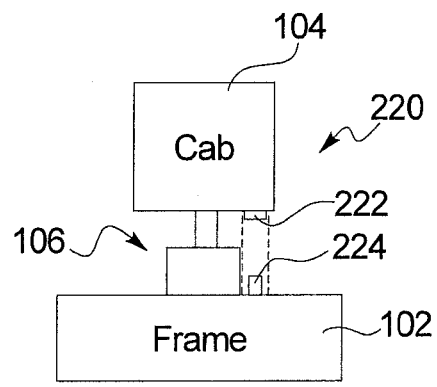
Figure 5C:
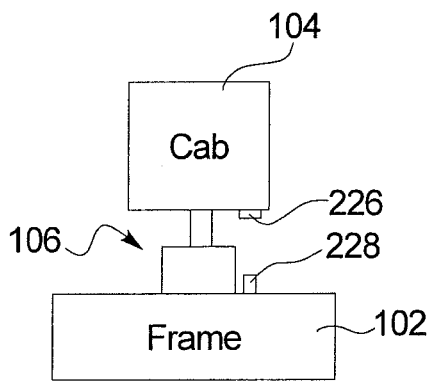
Figure 5D:
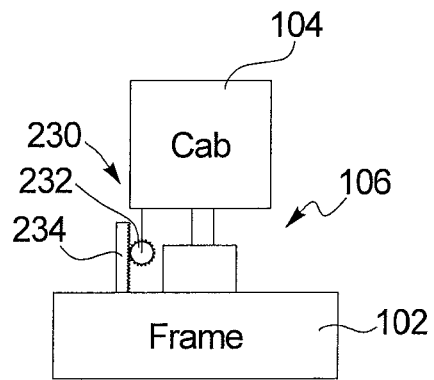

Referring now to FIGS. 5a-d, in addition to the methods and systems discussed above, controllable mount displacement measurement can be achieved with other sensors including through the use of a Hall-effect sensor 214. For example, as shown in FIG. 5a, a permanent magnet 216 may be positioned on the housing 108 of the controllable mount 106. A sensor chip 218 may be connected to the cab 104 and positioned to sense the relative position of the magnet 216. In another embodiment (FIG. 5b), an expandable chamber 220 may house a laser 222 in one end and a receiver 224 in the other end. Each end may be attached to one of the cab 104 and the machine frame 102. As the chamber 220 expands and contracts with the relative movement of the cab 104 and frame 102, accurate mount displacement measurement may be achieved. In another embodiment, a bar code reader 226 may be positioned to read a stainless steel or other corrosion-resistant material bar code display 228, as depicted in FIG. 5c. The display 228 may be attached to the frame 102 and the bar code reader 226 attached to the cab 104. In yet another embodiment, a rotary sensor 230 with a gear 232 disposed to move up and down a rack 234 (see FIG. 5d) may also be used to determine the displacement.

In addition to diagnosing and correcting for creep or set in the elastomeric member 124, the controllable mounts 106 of the present disclosure also provide a mechanism by which machine feedback may be provided to the operator. For example, the controllable mounts 106 can be hardened and thereby selectively lower damping so as to pass more of the vibration and impact loads to the cab 104 from the machine frame 102. As indicated above, hardening the controllable mounts 106 occurs when an electrical current is provided to coils 131 and the apparent viscosity of the rheological fluid 116 is increased. Conversely, when machine feedback is not as desirable as comfort of the operator, the controllable mount 106 may be softened by removing or reducing the current to thereby decrease damping. The level of damping may be manually selected by the operator, programmed to change during specific intervals of machine operation, and/or based on sensor inputs as described in greater detail below.

Figure 6:
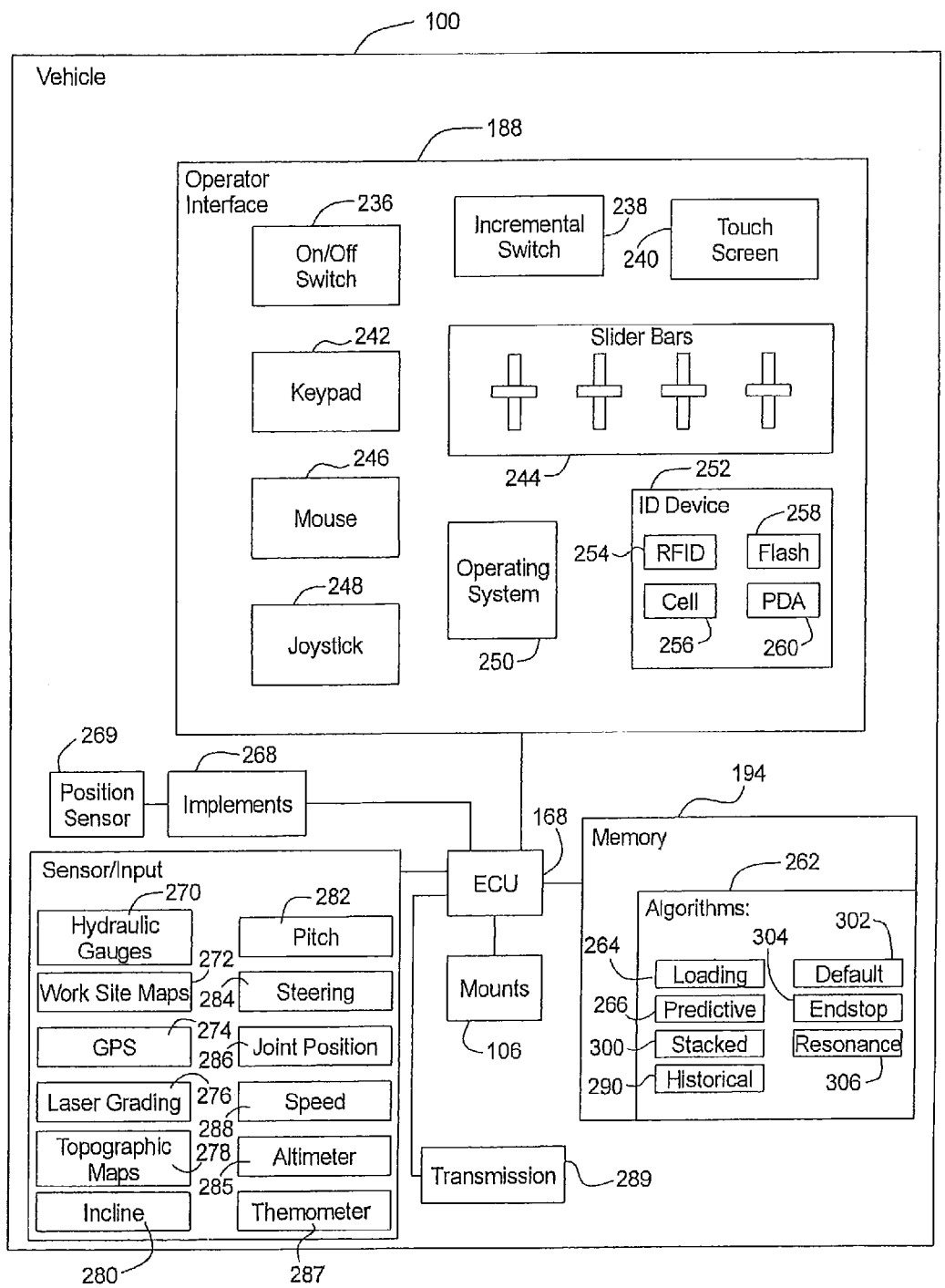
FIG. 6 is a block diagram of an operator interface constructed in accordance with the teachings of this disclosure.

Another feature of the present disclosure is that the operator interface 188 may permit the operator significant control over the controllable mounts 106. For example, as shown schematically in FIG. 6, the operator interface 188 may include an on/off switch 236 to enable an operator to turn the controllable mounts 106 off and thereby provide the softest ride at all times. In such a situation, the controllable mounts 106 would function simply as a viscous mount. Alternatively, an operator may adjust the control algorithm via an incremented switch 238, a touch screen 240, or a keypad 242 to scale the current flow provided by a control algorithm through the controllable mount 106. For example, the operator may scale the control algorithm to fifty percent (or other) in order to obtain a softer ride, which may result in a different dynamic rate and damping characteristics of the control system 182.

In another embodiment, the operator interface 188 may permit the operator to have to direct control over the current being applied to each controllable mount 106. For example, four slider bars 244 (or a different number if a different number of controllable mounts are used) may respectively represent the four respective mounts 106 and allow the operator to move the slider 244 on the operator interface 188 to fit his or her personal preferences. The operator interface 188 may be the touch screen 240 to allow direct control, or a mouse 246 or joystick 248 may be used to move a cursor over the screen 240 to make the desired changes to the controllable mount settings.

Further, the control of the controllable mounts 106 may be accessible through the menu or operating system 250 of the machine 100. In some embodiments, control of the controllable mounts 106 may be accessible only to a service technician via password protection or may be preprogrammed as part of an operator identification device 252 that would adjust settings to the specific operator. This may be achieved through the use of an RFID identification card 254, or operator information stored on such items as a cell phone 256, flash drive 258, personal digital assistant 260, or other computer readable media or device.

The operator interface 188 may also permit the operator to input or automatically input the geographical location of the machine 100 as well as road and worksite material conditions. Consequently, the electronic control unit 168 may adjust or implement a control algorithm to best compensate for the individual terrain characteristics of the worksite and thereby provide for the best ride. For example, if a rocky worksite is being traversed, the electronic control unit 168 may increase the current flow to the coils 131 to a higher level in each controllable mount 106 in order to provide the more damping to the cab 104 and operator. In one example, the machine 100 may operate at fifty percent of maximum current while traveling over the rocky terrain, and zero percent over a smooth worksite.

In a different configuration, and operator may also specify the type of machine task being performed, in which case different control algorithms 262 programmed to best damp vibrations when appropriate and allow feedback at other times may take over. For example, if the selected task is loading trucks from a pile of material, a loading algorithm 264 may be selected. The loading algorithm 264 may provide the controllable mounts 106 with fifty percent (or other) maximum current while moving between the truck and the pile, but during bucket loading and when the bucket is raised above a predetermined height, the electronic control unit 168 may increase the current flow to one hundred percent in order to provide machine feedback and thus provide better operator control.

In another example, an operator may indicate that the machine 100 is a motor grader and the task to be performed is fine grading. The electronic control unit 168 may then cause the controllable mounts 106 to be hard while the transmission of the machine 100 is in a forward gear, and soft while in a reverse gear. During fine grading, operators desire as much feedback as possible in order to more quickly complete the job within specified tolerances. Additionally, or alternatively, the controllable mounts 106 may be tuned to the desire of the operator for selected operational settings. For example, the operator may direct the electronic control unit 168 to pass one hundred percent current during fine grading, zero percent doing roading, and fifty percent during snow removal.

In other example, a wheel loader may keep the controllable mounts 106 soft during roading and moving around a worksite, but harden the controllable mounts 106 when the bucket is raised so that the operator can better feel the operation of the machine. In yet another example, the controllable mounts of a track-type tractor may be kept as soft as possible with zero current being passed through the coils 131 while the machine 100 is being moved with the bucket and ripper up. The same machine 100 may be programmed to pass the maximum current when either of those implements is performing a task.

Similarly, if the machine 100 is an excavator, when a large load is being placed, the controllable mounts 106 may be hardened so as to provide the operator with valuable feedback. In contrast, when the excavator is being moved, zero current can be passed through the controllable mounts 106 to provide a softer, more comfortable ride to the operator. Commonly with excavators, the controllable mounts 106 may always be soft, except when transients occur during dumping, digging or other events.

The teachings of the present disclosure can also be employed for detecting track slippage in a track-type tractor. By setting the controllable mounts 106 to a high current setting, the operator is provided with increased feedback. This feedback may indicate to the operator that track slippage is occurring. In such an event, the operator may choose to cease operations so that maintenance can be performed and thus minimize undercarriage wear.

The control system 182 of the present disclosure may also employ any of the control algorithms 262 to most effectively and expeditiously balance feedback and comfort. In addition to the loading algorithm 264 mentioned above, a predictive algorithm 266 may be used by the electronic control unit 168 to control the controllable mounts 106. The controllable mounts 106 may be tuned to the specific machine use and task being performed, such as dozing, ripping, grading, or excavating, or to the desired setting such as improved ride, noise reduction or operator comfort. Specific machine use and task may be entered by the operator as indicated above, or may be determined from the position of a blade, ripper, bucket or other implements 268 of the machine 100 as sensed by an implement position sensor 269. Alternatively, they may be inferred from the operator interface 188, hydraulic pressures gauges 270, worksite maps 272, global positioning system information 274, laser grading inputs 276, topographical maps 278, inclinometers 280, determined pitch rates 282, steering signals 284, altimeters 285, articulation joint position 286, and thermometers 287. For example, shock loads may be anticipated from the position of a truck in a loading zone and thus the controllable mount 106 may be adjusted accordingly to absorb as much of the impact from loading as possible.

Alternatively, when the bucket of a wheel loader, tracked loader, excavator or other machine using buckets is lowered and positioned for engagement with a pile, the controllable mounts 106 may be initially softened and then hardened when the hydraulic cylinder pressures exceed a predetermined threshold to provide feedback to the operator while minimizing the impact of the bucket engaging the pile. In addition, speed of the machine 100 can be used to predict the desired settings for the controllable mounts 106. For example, at higher speeds, as sensed by a speedometer 288, the controllable mounts 106 may be softer and then hardened when the machine slows 100. This hardening and softening may also be dependent on a transmission 289 of the machine (100), specifically a gear in which the machine 100 is operating. In first gear a fifty percent (or other) current may be passed through the coils 131 and in a second gear forty percent may be passed. In third gear, twenty five percent current may be passed and in fourth gear zero percent may be passed. Harder mounts at lower speeds would provide the operator with a better feedback, while higher speeds would provide greater comfort.

The predictive algorithm 266 may also use the sensed speed of the implement to control the controllable mounts 106. For example, when a blade is lowered the initial contact with the ground can jar the operator. Thus, when the blade is being dropped, the controllable mounts 106 may be softened in anticipation of the impact and hardened after contact has been made to improve feedback and control. Generally, the control algorithm 262 may also be set up to control the vibrational, heave, pitch, roll and yaw modes as well. The predictive algorithm 266 may also be used to predict that when an implement 268 is not in use and the machine 100 is moving at a relatively high rate of speed, this may mean that roading is taking place and the controllable mounts 106 should be adjusted for maximum comfort.

A historical algorithm 290 may also be used. More specifically, a histogram of the performance of each controllable mount 106 may be obtained from the sensors associated with each controllable mount 106. The histogram may be used to continuously tune each individual controllable mount 106 to current conditions. In other words, the electronic control unit 168 uses the sensor histories to adapt the controllable mount 106 to current performance, thus providing improved performance over time and use. For example, peak pressure and frequency may be kept to develop a history of performance to identify when to harden and soften with decay rate. If the controllable mount 106 undergoes very little movement over a past history, it can soften itself up to avoid unnecessary harshness and wasting of energy. As more motion is seen, the controllable mount 106 can then increase damping. For example, if while the machine is roading, high frequency small displacement vibration is sensed, the controllable mounts 106 can soften up to minimize noise, increase comfort, and save energy. When the machine 100 begins encountering rough terrain, the electronic control unit 168 may increase current to change the damping of the controllable mount 106 to compensate for the larger low frequency displacement.

Figure 7:
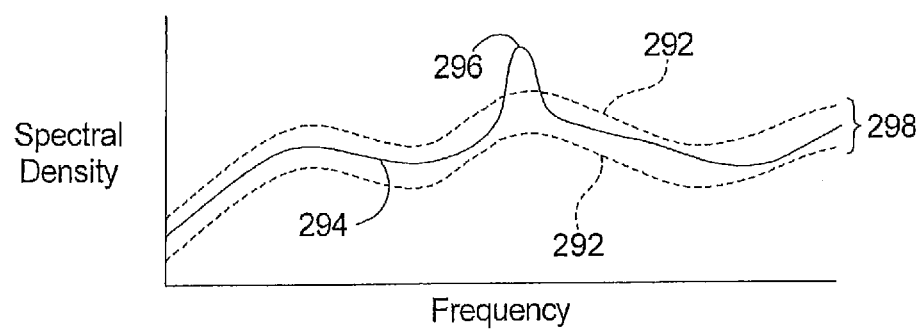
FIG. 7 is a graph plotting frequency vs. spectral density, depicting historical data associated with a controllable mount, and identifying when a mount should be replaced or repaired.

In order to prevent failure of one of the controllable mounts 106 from causing damage to the other controllable mounts 106 and/or other machine systems through continued use, the sensor data collected from sensors associated with the controllable mount 106 may be collected and used by the historical algorithm 290 to provide a history of operation which may then be used to determine operating tolerances. The current sensor data may be used to provide the power spectral density of the controllable mount 106 and determine if the controllable mount 106 should be replaced. For example, and referring to FIG. 7, the dotted lines 292 may represent the tolerances for acceptable operation for the controllable mount 106 and the solid line 294 may represent the actual running power spectral density. A spike 296 outside of a tolerance zone 298 or an average error which exceeds the tolerance zone 298 may indicate that the controllable mount 106 should be replaced. In an alternative, the displacement and acceleration of the cab 104 relative to the mount 106 or the exact displacement of the mount components could be used to follow the life of the controllable mount 106 and feed the historical algorithm 290 to control the stiffness of the controllable mount 106.

Figure 8:
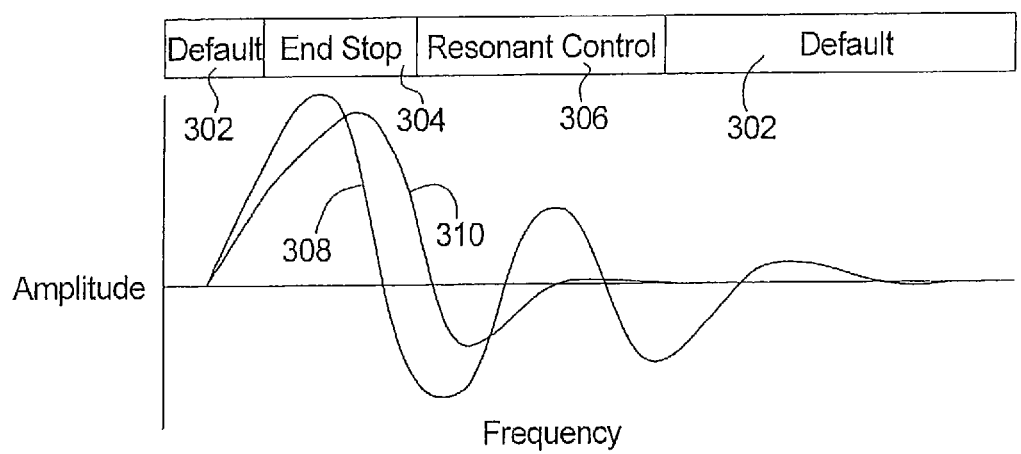
FIG. 8 is a graph plotting frequency vs. amplitude, and depicting stacked algorithms controlling same in accordance with the teachings of this disclosure.

These control algorithms 262 and the others discussed herein may be implemented as stacked algorithms 300 as well. For example, the electronic control unit 168 may use a default algorithm 302, an end stop algorithm 304, and a resonant control algorithm 306. The default algorithm 302 may use the controllable mount history to adjust the current to performance needs. All three algorithms may be calculated together and priority may be given to the algorithm that provides the highest force control over the controllable mount 106 under the current circumstances. For example, and referring to FIG. 8, the machine 100 may be roading during which the default algorithm 302 may be used to control the controllable mount 106. If the machine 100 moves over a pothole, that will provide an impulse to the control system 182 which if undamped is represented by line 308. Line 310 represents the effect produced by the stacked algorithms 300 in response to the impulse. The default algorithm 302 may control until the endstop algorithm 304 may then be given priority to control the controllable mount 106. After the endstop algorithm 304 has acted, the resonant control algorithm 306 may be given priority to dampen out a resonance caused by the impact with the pothole. The default algorithm 302 may resume control of the controllable mount 106 once the resonance has been controlled.

In addition to operator selected control and the control to provide operator feedback, the electronic control unit 168 may be used to provide cab 104 leveling and adjustment. Specifically, static load adjustment and ride height adjustment may be attained by adjusting the gas spring 142 to bias the pin 120 of each mount 106 away from engagement with the housing 108 and toward its ideal snubbing height 144. This therefore avoids having the pin 120 engage the housing 108 in "topping out" or "bottoming out" fashion. The electronic control unit 168 may monitor the relative displacement and adjust the gas spring 142 by adding or releasing gas. If the sensors 160, 170 indicates that the mount 106 is at or near the ideal snubbing height 144, no action is taken by the electronic control unit 168 to adjust the pressure within the gas spring 142.

This adjustment of the controllable mount 106 may be beneficial to compensate for different sized operators who may or may not be carrying tools, food and other equipment in the cab 104. The different loads may move the controllable mounts 106 away from the ideal snubbing height 144. In some applications, the machine 100 may be operating on a slope and thus the downside controllable mounts may bear a larger portion of the load. Thus, the downside controllable mounts may not be located at their ideal snubbing heights 144. The pneumatic chamber 114 of each mount 106 may thus be individually adjusted to return each mount 106 to the ideal snubbing height 144.

Changes in altitude and ambient temperature may also move the controllable mounts 106 from their ideal snubbing heights 144. For example, a machine 100 that has been operating in zero degree temperatures at sea level and then taken into the mountains and used at six thousand feet above sea level in fifty degree temperatures may have mounts that are no longer disposed at their ideal snubbing heights 144. The present disclosure may therefore adjust for this change in altitude and ambient temperature to return the mounts 106 to their ideal snubbing heights 144.

A mixed mount arrangement may also be used to provide reduced cost and complexity while providing many of the benefits associated with controllable mounts. For example, as shown in FIGS. 9*a-e*, controllable mounts 106 may be used at some locations to provide controllability to the cab response while using lower cost mounts to help support/attach the cab 104 at other locations. In one embodiment (see FIG. 9*a*), where pitching of the cab 104 is desired to be controlled, two passive mounts 312 may be positioned at a front 314 of the cab 104 and two controllable mounts 106 may be positioned at rear locations 316. Thus, through selective hardening of the controllable mounts 106, the pitch and roll motion may be controlled. The configuration may also be reversed as in FIG. 9*b* with two passive mounts 312 positioned at the rear 316 of the cab 104 and two controllable mounts 106 positioned at the front 314 of the cab 104. As used herein, passive mounts have dampening characteristics that cannot be altered during operation and include, for example, viscous and rubber mounts.

Figure 9A:
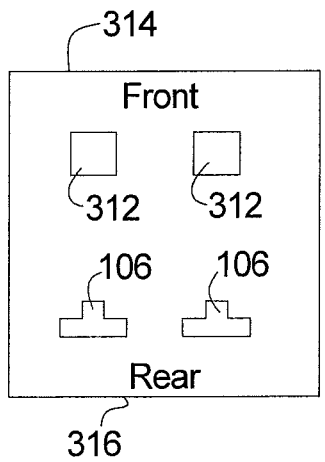
FIGS. 9*a-e* are schematic representations of different mount location embodiments.
Figure 9B:
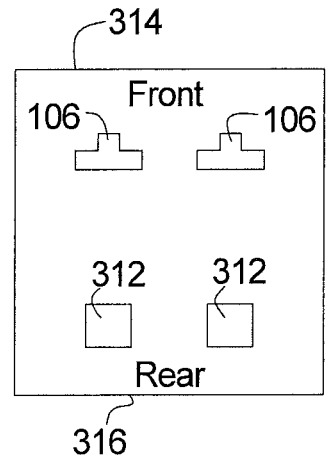
Figure 9C:
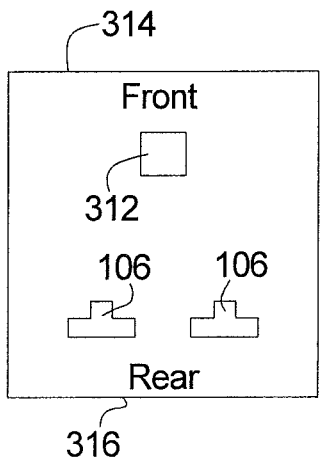
Figure 9D:
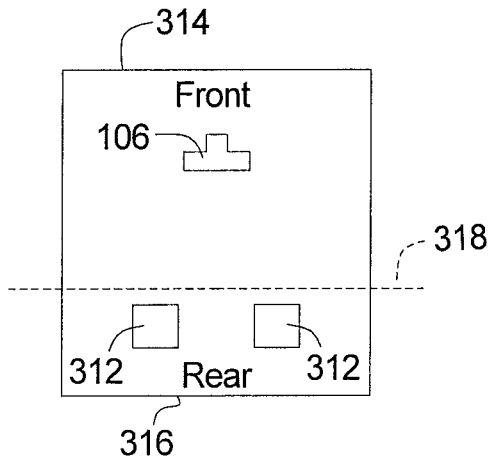

Alternatively, a three-point system may also be possible with a single passive mount 312 in front 314 and two controllable mounts 106 positioned at the rear 316 of the cab 104, as shown in FIG. 9*c*, so that the structure is less expensive and easier to manufacture for plane and positional alignment. In yet another embodiment (see FIG. 9*d*), two passive mounts 312 may be mounted near an inertial pitch axis 318 with a third controllable mount 106 being mounted away from the axis 318.

Figure 9E:
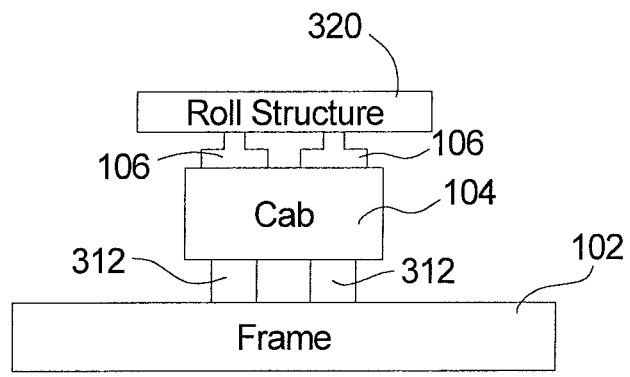

Another cab mounting arrangement may be used with machines 100 that include an external roll-over protection structure 320. For example, as shown in FIG. 9*e*, passive mounts 312 may be mounted between the cab 104 and the frame 102 of the machine 100. One or more controllable mounts 106 may be disposed above the cab 104 and mounted between the cab 104 and the external roll-over protection structure 320. In this configuration, the passive mounts 312 provide noise reduction and the overhead controllable mounts 106 may provide ride control.

INDUSTRIAL APPLICABILITY

From the foregoing, it can be seen that the teachings of this disclosure have applicability in a variety of industrial situations, particularly with machines to which operator cabs are mounted. Such machines may include, but are not limited to, track-type tractors, wheel loaders, track loaders, excavators, motor graders, articulated trucks, off-highway trucks, skid steers, skidders, and the like. The machines may employ a controllable mount so as to isolate the vibrations generated by the undercarriage and engine of the machine from the cab and thus the operator within the cab.

In addition, by providing a mount such as that disclosed herein, the ideal snubbing height of the pin within the housing can be maintained. In so doing, excessive loading and bottoming out or topping out of the mount during machine operation can be minimized or eliminated. This in turn can help to extend the serviceable life of the mount. Moreover, by monitoring the relative displacement of the pin with regard to the housing, a diagnostic can be generated indicating when an elastomeric member of the mount, or the mount itself, should be replaced.

The teachings of the present disclosure may also be used to construct a machine that provides increased feedback to the operator. By stiffening the mounts, the operator will more acutely feel vibrations which can prove valuable in performing tasks, such as fine grading, plowing, or excavating, or sensing conditions such as track slippage. Conversely, when roading the mounts can be relaxed to decrease feedback and thus provide better operator comfort.

The present disclosure also has applicability in providing a machine mount control system wherein an operator can select a desired hardness or feedback level through an appropriate operator interface. Such an operator interface can also allow the operator to select the type of task being performed and the control system can then set the mount accordingly.

Sensors can also monitor the positions or speeds of the machine or implements to then predict the type of task being performed. Once predicted, the appropriate mount settings can be used. Such a predictive algorithm approach can not only use machine sensed parameters, but utilize global positioning satellite and other mapping technology as well to predict the task and desired mount settings.

What is claimed is:

1. A machine, comprising:
   a frame;
   an operator cab supported by the frame;
   at least one movable implement operatively associated with the frame;
   a controllable mount operatively connecting the operator cab to the frame, the controllable mount including:
      a housing having a first chamber filled with a rheological fluid, the first chamber separated into an upper portion and a lower portion by a damping plate fixedly attached to a pin, and a second chamber filled with a pressurized gas, the second chamber separated from the lower portion of the first chamber by a plunger fixedly attached to the pin;
      the pin coupled to the operator cab and mounted within the housing; and
      coils positioned relative to the housing to generate a field through the rheological fluid; and
   an electronic control unit operatively associated with the coils and adapted to change a level of current applied to the coils to adjust an apparent viscosity of the rheological fluid based on machine operation.

2. The machine of claim 1, wherein the operator cab includes an operator interface through which an operator can input a type of machine operation.

3. The machine of claim 2, wherein the type of machine operation is selected from the group of machine operations consisting of at least two of loading, ripping, grading, plowing, dumping, and roading.

4. The machine of claim 1, wherein the machine further includes a sensor adapted to detect movement of the implement, the electronic control unit being adapted to detect a type of machine operation based on a signal received from the sensor.

5. The machine of claim 1, wherein the electronic control unit employs a predictive algorithm and predicts the machine operation based on sensed machine parameters.

6. The machine of claim 5, wherein the sensed machine parameters are selected from the group of machine parameters consisting of hydraulic pressure, incline, decline, determined pitch rate, steering signals and articulation joint position.

7. The machine of claim 1, wherein the electronic control unit increases current flow to the coils when the machine operation is fine grading.

8. The machine of claim 1, wherein the electronic control unit decreases current flow to the coils when the machine operation is roading.

9. The machine of claim 1, wherein the electronic control unit decreases current flow when the machine operation is excavating.

10. The machine of claim 1, wherein the electronic control unit increases current flow when the machine operation is loading.

11. The machine of claim 1, wherein the electronic control unit further senses a gear in which a transmission of the machine is operating, and decreases current flow to the coils as the gear increases.

12. The machine of claim 1, wherein the electronic control unit further senses a speed of the machine and decreases current flow to the coils as the speed increases.

13. The machine of claim 1, wherein the electronic control unit further senses a speed with which the implement is moved, and increases current flow to the coils as the implement speed decreases.

14. The machine of claim 1, wherein the rheological fluid is one of a magneto-rheological fluid and an electro-rheological fluid.

15. A method of controlling a cab mount, comprising:
   connecting a cab to a frame of a machine using the cab mount, the machine including at least one movable implement, the cab mount having:
      a pin; and
      a housing having a first chamber filled with a rheological fluid, the first chamber separated into an upper portion and a lower portion by a damping plate fixedly attached to the pin, and a second chamber filled with a pressurized gas, the second chamber separated from the lower portion of the first chamber by a plunger fixedly attached to the pin, the housing and the pin coupled to the cab and movable relative to the housing;
   sensing a type of operation being performed by the machine; and
   adjusting current flow to coils positioned relative to the housing based on the sensed operation.

16. The method of claim 15, wherein the type of operation is sensed based on a relative position of the implement attached to the machine.

17. The method of claim 15, wherein the type of operation is sensed based on a combination of sensed machine parameters, and the method further employing a predictive algorithm to determine the type of operation based on the combination of sensed machine parameters.

18. The method of claim 17, wherein the sensed machine parameters are selected from the group of sensed machine parameters consisting of hydraulic pressure, incline, decline, determined pitch rate, steering signals and articulation joint position.

19. The method of claim 15, wherein the type of operation is sensed based on a combination of sensed machine parameters, and the method further employs a plurality of stacked algorithms used in sequence to determine the current flow to the coils.

20. A control system for controlling a mount operatively connecting an operator cab to a machine having at least one movable implement, comprising:
   a controllable mount including a housing, a pin coupled to the operator cab and movable within the housing, the housing having a first chamber filled with a rheological fluid, the first chamber separated into an upper portion and a lower portion by a damping plate fixedly attached to the pin, and a second chamber filled with a pressurized gas, the second chamber separated from the lower portion of the first chamber by a plunger fixedly attached to the pin and coils mounted proximate to the rheological fluid;

a sensor adapted to monitor parameters associated with the machine; and an electronic control unit adapted to determine a type of operation being performed by the machine based on the sensed parameters of the machine and adjust a level of current applied to the coils based on the determined type of operation.

* * * * *